Sept. 21, 1965 G. M. LUCICH 3,207,642
PROCESS OF MANUFACTURING A TUBE CONTAINING
ONE OR MORE ELECTRODES
Filed March 6, 1963 2 Sheets-Sheet 2

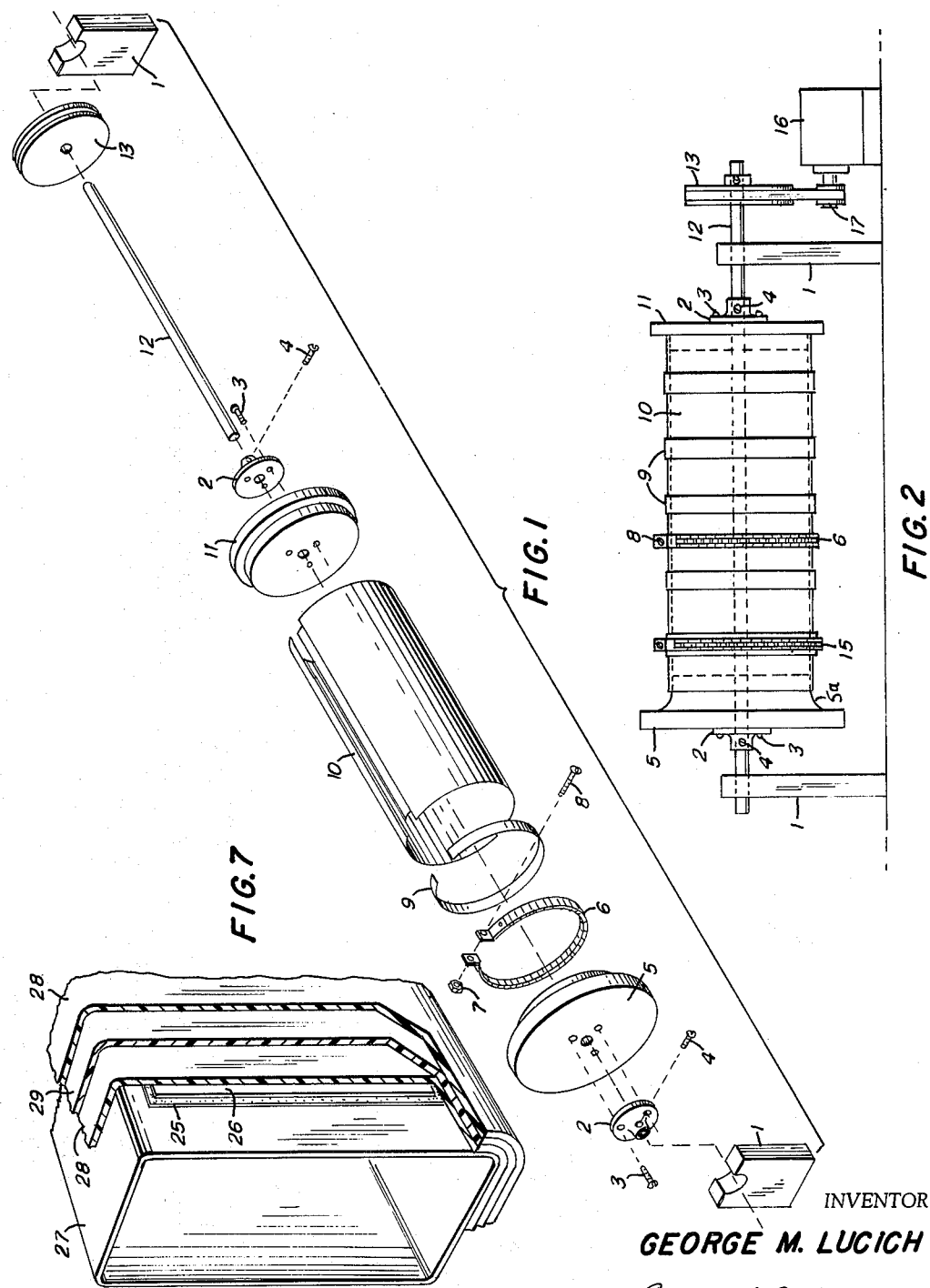

INVENTOR
GEORGE M. LUCICH

BY

ATTORNEYS

United States Patent Office 3,207,642
Patented Sept. 21, 1965

3,207,642
PROCESS OF MANUFACTURING A TUBE CONTAINING ONE OR MORE ELECTRODES
George M. Lucich, 301 G St. SW., Apt. 214,
Washington, D.C.
Filed Mar. 6, 1963, Ser. No. 263,360
7 Claims. (Cl. 156—191)
(Granted under Title 35, U.S. Code (1952), sec. 266)

The invention herein described and claimed may be manufactured and used by or for the Government of the United States of America for governmental purposes without the payment of royalties thereon or therefor.

This invention is concerned with the manufacture of plastic structures, such as cylinders, flat plates, curved surfaces, etc., having a dissimilar, non-plastic material embedded therein.

More particularly, the invention is concerned with the manufacture of plastic tubes having metallic electrodes attached to the inner surface thereof, which are of particular utility in fish counting systems.

Fish counting systems find utility in a variety of applications, e.g., in the management of commercial fisheries to provide statistical information on escapement; in management of sport fisheries as a source of statistical information on the abundance of the stream fish; to the engineer in testing the adequacy of fish passing facilities at dams and to the commercial fishermen in testing the adequacy of traps.

One widely used type of fish counting system consists of an electronic circuit employing tubes through which the fish must pass. These tubes contain electrodes which form a part of the electronic circuitry. Such a system is described in U.S. Patent No. 2,893,633 to van Haagen. Various types of electrode-containing tubes have been employed in fish-counting systems heretofore; however, all have been found to be deficient in one or more respects. For example, a typical prior art electrode-tube structure is formed by bolting the electrodes to the inner surface of the tube. Such a structure, in which the electrode is not recessed into the tube, has been found unsatisfactory in several respects, e.g., debris such as sticks become entrapped against or under the electrodes resulting in hindrance of passage of the fish through the tube. Furthermore, this debris may result in injury to fish. In addition, any such debris which is caught under the electrode may result in upsetting the electrical characteristics of the system. Furthermore, turbulence resulting from the location of the electrode may deter the fish from entering the tube.

It has now been found that, in order to be of maximum utility, these electrode-containing tubes should exhibit the following characteristics; precise location of electrode(s) within the tube and recessed into the inner surface thereof; electrodes firmly embedded into the tube substance and securely bonded thereto; minimum weight with sufficient strength and rigidity to withstand severe stresses; simplicity in adaptation to mounting in various supporting devices and for mounting of various entrance and exit structures; adaptable to group mounting; tube substance compatible with all presently used electrode material; durable permanent color and availability of wide color range; simplicity of manufacturing process and reuse of manufacturing equipment; flexibility of tube design and low cost of manufacture.

It is therefore an object of the present invention to provide a method for manufacture of a plastic structure having a dissimilar material securely attached thereto and embedded therein.

It is a further object to provide a plastic tube having metallic electrodes attached to and flush with the inner surface thereof.

It is a further object to provide such a tube in which the electrodes are securely attached to the tube by means of barbs or the like.

It has now been found that these objectives may be achieved by means of the hereinafer described process. A description of a specific embodiment follows, with reference to the drawings.

FIG. 1 is an exploded, perspective view of the mold assembly employed in forming the tubes of the invention showing the parts thereof.

FIG. 2 is an elevation view of the assembled mold with electrodes in place thereon.

FIG. 7 is a cross-sectional view of a section of a rectangular tube containing a non-closed loop electrode.

Figure 4:
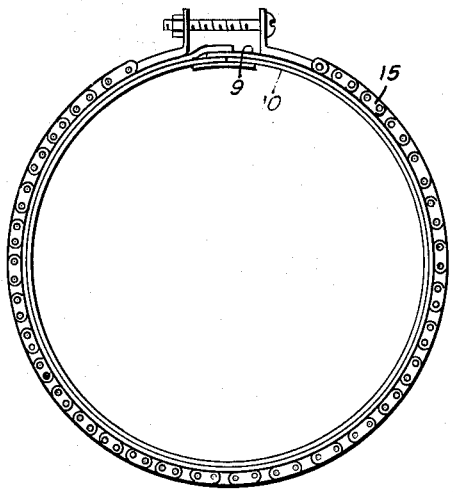
FIG. 4 is an end view of the mold with electrode secured thereto by means of a chain clamp.

The initial step in the process consists in making the mold assembly as illustrated in FIGURES 1 and 2. Steel flanges 2 are attached to wooden end molds 5 and 11 by means of screws 3 (these flanges need not be removed thereafter, during or after the manufacturing process) and these subassemblies are mounted on steel shaft 12. End molds 5 and 11 are then fitted in the ends of a tube mold 10, preferably made of sheet metal, and secured in position by closing tube mold 10 with chain clamp 6 and associated screw 8 and nut 7. Tube mold 10 is thereby compressed around the first step on end molds 5 and 11 to form the completed (with the exception of the electrodes) mold assembly. Set screws 4 on flange 2 are then tightened. The longitudinal joint in tube mold 10 and the juncture of end mold 5 and tube mold 10 are then sealed, with tape for example, to prevent the subsequently applied resin from entering the interior of the tube mold. A coating of wax may be applied to the juncture of end mold 11 and tube mold 10 if the fish counting tube under construction is long enough to approach this juncture. End mold 5 contains a tapered portion 5a as illustrated in FIGURE 2; this serves to form a flared end on the tube.

The mold assembly is then coated with a mold releasing agent; ordinary auto or floor wax have been found to be satisfactory although any material which will prevent the resin from sticking to the mold without adverse effect on the resin may be used.

Figure 3:
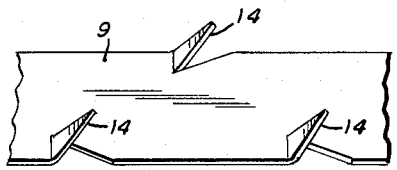
FIG. 3 is a partial perspective view of the notched electrode.

Electrodes 9 (FIGURE 2), which may be of Monel metal or other corrosion resistant metal and are about ¾ inch in width in the embodiment shown, are notched about every 2 inches, as shown in FIGURE 3, as by cutting with hand shears and bending. The thus formed barbs 14, all projecting in the same general direction and being about 3/16 inch long and ⅛ inch wide, serve to assure a firm attachment to the subsequently formed tube material. Tape is then applied to the opposite (non-barbed) surface of the electrodes which are then clamped on tube mold 10 in the desired positions by means of a chain clamp 15 (FIGURE 2) in such manner that the ends overlap as shown in FIGURE 4 and the barbs project out from the surface of tube mold 10.

This point of overlap of the electrode ends is then soldered, following which the chain clamp is removed. Cleaning of the electrodes at the point of overlap may be necessary to facilitate soldering. If the material used for the electrodes is not solderable with standard lead-tin radio solder it will be necessary to plate the point of overlap with a compatible metal. Use of higher temperature silver solder is best avoided as it may result in burned tape and heat warping of the tube mold.

A layer of Fiberglas, a woven glass cloth weighing about 8½ ounces per square yard which serves as a reinforcing material, is then applied over the mold assembly and, while rotating the assembly, the glass cloth is saturated with a suitable resin by means of a brush or by spraying. If a flared end is required various shaped pieces of cloth may be necessary to conform to the curved portion 5a of end mold 5 (FIGURE 2). Rotation of the mold assembly is accomplished by means of a motor 16 and pulleys 13 and 17 which turn shaft 12 in supports 1 (FIGURES 1 and 2) and is continued while the resin hardens to give a smooth surface and prevent the resin from running out of the pores in the material. A rotation speed of about 1 to 2 revolutions per second has been found satisfactory.

The resin found to be most satisfactory for the process of the invention is Laminac 4110, available from American Cyanamid Company, consisting of a solution in styrene of a linear polyester resin derived from (1) a dihydric alcohol and (2) an organic dicarboxylic acid or anhydride, part of (2) consisting of a dibasic acid or anhydride with $\alpha$-$\beta$ ethylenic unsaturation such as maleic anhydride. A peroxy catalyst, as for example methyl ethyl ketone peroxide, is added to the resin prior to application to cause or accelerate hardening of the resin. About 2 ounces of catalyst per gallon of resin is usually sufficient at room temperature; increased amounts, e.g. 4 ounces per gallon, may be necessary at lower temperature. Furthermore, an accelerator consisting of a solution in an organic solvent of an organic salt of cobalt such as cobalt naphthenate or cobalt octoate may be added to the resin prior to application in order to further facilitate hardening. About 1 ounce per gallon of accelerator has been found to give very satisfactory results. Initial hardening usually requires about 30 minutes; however, it has been found preferable to allow the resin to set for a period of 3 to 4 hours before removing from the mold.

Figure 5:
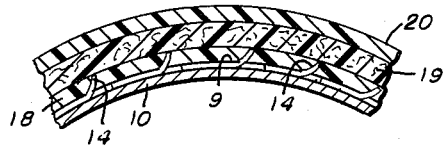
FIG. 5 is a partial cross-sectional view of the mold with electrode and cloth-and-resin and mat-and-resin layers thereon.

The above process is repeated, with additional layers of glass cloth saturated with resin being applied on top of the previous layer until the desired thickness is obtained. Alternatively, succeeding layers may be formed using mat (weighing about 2 ounces per square foot) consisting of non-woven straight glass fibers laid down in random directions, which is then saturated with resin, in place of cloth. The preferred embodiment utilizes alternate layers of resin-saturated mat 19 and resin-saturated cloth 18 and 20 as shown in FIGURE 5. Succeeding layers should be applied while the previous layer is still tacky. A sharp instrument is then used to cut the tube to the desired length while it is still rotating. If the barbs on the electrodes are too long they must be bent over before the final layer of material is applied.

Set screws 4 are then loosened and end molds 5 and 11 are removed from shaft 12. Tube mold 10 is then collapsed by bending one side down and is removed from the tube.

This completes formation of the tube proper; the following procedure is employed in attaching a mounting flange to the tube.

Figure 6:
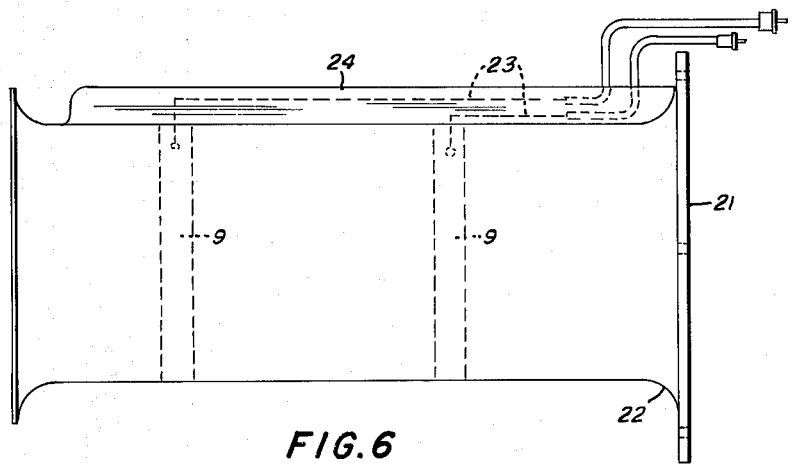
FIG. 6 is an elevation view of the tube assembly showing attachment of leads.

A layer of the glass cloth, as employed in formation of the tube, is placed on a non-compatible plastic surface such as cellophane or Mylar. The end of the tube opposite the flared end is roughened, e.g., with sandpaper, and placed on the layer of glass cloth with the tube in an upright position. The glass cloth is then saturated with resin by means of a brush or spray and allowed to harden, thereby bonding the flange material to the tube. This process is repeated with additional cloth or mat and resin until a mounting flange of sufficient thickness is obtained. Flange material within the circumference of the tube is then removed to obtain a surface flush with the inner surface of the tube and mounting holes are drilled in the flange as required. Attached flange 21 with mounting holes is shown in FIGURE 6. Additional cloth and resin may be used to form a fillet 22 between tube and mounting flange as shown in FIGURE 6.

In order to prepare the tube for use in an electronic counting system, the electrodes must be connected to lead wires which serve as conductors. These connections are made by drilling a hole through the tube and electrode and inserting a round head brass machine screw, the head of which is then soldered to the electrode. A nut is then tightened on the screw and soldered thereto. The lead wire is then wrapped around the screw and soldered thereto.

After attachment of the lead wires, the tube is placed horizontally with wire side up, the surface of the tube where the wires are to be located is roughened and the wires 23 (FIGURE 6) are then covered with layers of glass cloth and resin in a manner similar to that in preparation of the tube and flange. The wires are thereby embedded in the plastic material 24, thus providing a neat and durable attachment of the wires to the tube-electrode unit as illustrated in FIGURE 6. The unit is then complete and ready to be used in an electronic fish counting system.

Obviously many variations may be made in the process of manufacturing the structures of the invention without departing from the essential spirit and scope thereof. The parts of the mold assembly could be of other materials than those specified in the above description of the invention, e.g., all parts could be metal, wood, plastic or any convenient mold forming material. The size and shape of these parts may also vary widely depending, of course, on the size and shape of the product desired. The shape of end mold 5, for example, may be varied greatly depending on the size and shape of the flare desired, if any.

The size of the tube desired in the fish counter embodiment of the invention will depend on many factors such as size and number of fish, environment in which the tube is to be used and the associated electronic circuitry. Tubes having diameters ranging from 8 inches to 14 inches and lengths from approximately 15 to 35 inches have been prepared by the method of the invention and used successfully. Thickness of the tube walls as well as that of the flare and flange may also vary considerably and will depend on the strength required for the environment in which the tube is used.

The electrodes may also vary widely as to size, shape, thickness, number and position in the tube. They may also be of conducting material other than the Monel metal of the above described specific embodiment, non-corrosive metals such as stainless steel or bronze for example. Furthermore, the "barbs" which serve to provide a secure attachment to the plastic material need not be formed from the electrode material but may consist of separate structures attached thereto by a variety of means as will be evident to one skilled in the art, e.g., soldering, riveting, etc.

Other resin materials and/or catalysts or accelerators may also be used in place of those of the above specific embodiment. Any liquid or semi-liquid resin (a consistency about that of maple syrup appears to give best results) which can be readily applied to the mold so as to saturate the cloth or mat thereon and which will harden on standing to form a durable structure may be used. Polyester resins of the type described in U.S. Patents 2,514,141 and 2,861,910 have been found to be particularly satisfactory. Suitable conventional polymerization catalysts are also more fully disclosed in Patent No. 2,861,910. If deemed necessary the tube may be heat cured.

Materials other than Fiberglas or glass mat may also be used as the fibrous reinforcing material, provided they are sufficiently porous and compatible with the resin so that the combination of resin and fibrous material forms a stable and durable structure capable of withstanding the stresses of the environment in which the tube is to be used. Examples are fabrics from natural or synthetic organic fibers such as cotton, wool, nylon or rayon.

Though a cylindrical tube is usually preferable because of strength and ease of manufacture, the tube may be prepared in other forms such as with a square or rectangular cross section by simply employing an appropriately shaped mold. Furthermore, tubes may be prepared in which the electrode(s) are not closed loops as illustrated in FIGURE 7. This may be accomplished by the use of double surface tape 25 to hold the electrode 26 in place on the tube mold 27 while the cloth and resin 28 and mat and resin 29 are being applied as shown in FIGURE 7.

Though the invention has been described with particular reference to fish counting tubes and associated metallic electrodes, the method of the invention is also applicable to manufacture of structures having other fields of utility such as reinforced plastic shapes in automobile bodies, boat hulls, etc. These structures may comprise metal attached to plastic for purposes other than or in addition to electrical conductance, e.g., for decorative or reinforcement purposes. Furthermore, the non-plastic material is not limited to metal but may be any material which is dissimilar to, but compatible with the plastic; in such embodiments the non-plastic material is provided with barbs which may be formed in the manner shown above, or by attaching the bars thereto, as by welding, bolting, etc. Provision of these bars has been found to be a particularly valuable aspect of the invention since they ensure secure attachment of the non-plastic material to the plastic material. The strength and durability of the products of the invention are further enhanced by the non-plastic material being embedded in the plastic material; this feature further adds to the appearance and usefulness of the products for many purposes, particularly in fish counting systems as described above.

What is claimed is:
1. A method for preparing a device, for use in an electronic counting system, consisting of a plastic tube having one or more electrodes attached to the inner surface thereof, comprising detachably securing to the surface of a mold of suitable size and shape at least one electrode having barb means extending generally in a direction away from the surface of the mold, applying a layer of fibrous material over the mold, electrode and barb means and subsequently saturating the fibrous material with a fluid resin composition capable of hardening to form a tube having the shape of the mold and containing the electrode secured to the inner surface thereof, curing the resin to harden it, removing the tube from the mold and subsequently connecting the electrodes to lead wires.

2. Method of claim 1 in which the electrode is a non-corrosive metal.

3. Method of claim 1 in which the fibrous material is glass cloth.

4. Method of claim 1 in which the fibrous material is glass mat.

5. Method of claim 1 in which the tube is formed by application of alternate layers of resin-saturated glass cloth and resin-saturated glass mat.

6. Method of claim 5 in which a mounting flange is formed at one end of the tube by applying thereto at least one layer of a fibrous material, said material being saturated with resin.

7. Method of claim 5 in which wire leads are subsequently connected to the electrode and are embedded in at least one additional layer of resin saturated material.

References Cited by the Examiner
UNITED STATES PATENTS

| | | | |
|---|---|---|---|
| 976,030 | 11/10 | Bispham | 138—174 XR |
| 1,706,635 | 3/29 | Smith | 156—92 XR |
| 2,244,635 | 6/41 | Williamson | 138—138 XR |
| 2,261,633 | 11/41 | Spooner | 156—190 XR |
| 2,408,483 | 10/46 | Rodman | 156—91 XR |
| 2,415,032 | 1/47 | Edgar et al. | 156—92 XR |
| 2,426,384 | 8/47 | Blanchard | 156—92 |
| 2,530,835 | 11/50 | Muller | 156—190 XR |
| 2,631,955 | 3/53 | Muskat | 156—184 |
| 2,768,920 | 10/56 | Stout | 156—184 |
| 2,882,072 | 4/59 | Noland | 138—138 XR |
| 2,938,939 | 5/60 | Malcolm | 174—68.5 |
| 3,077,511 | 2/63 | Bohrer et al. | 174—68.5 |

EARL M. BERGERT, *Primary Examiner.*
JOHN P. WILDMAN, *Examiner.*